United States Patent
Suzuki et al.

[11] Patent Number: 5,826,479
[45] Date of Patent: Oct. 27, 1998

[54] CUTTING DEVICE

[75] Inventors: Takayuki Suzuki, Nagoya; Yoshimitsu Yamaguchi, Chita-gun; Masahiro Asano, Kariya, all of Japan

[73] Assignee: Nippondenso Co., Ltd., Kariya, Japan

[21] Appl. No.: 712,799

[22] Filed: Sep. 12, 1996

Related U.S. Application Data

[63] Continuation of Ser. No. 285,102, Aug. 3, 1994, abandoned.

[30] Foreign Application Priority Data

Aug. 3, 1993 [JP] Japan .................................. 5-212256

[51] Int. Cl.$^6$ ....................................................... B26D 1/56
[52] U.S. Cl. .................................. 83/318; 83/337; 83/646
[58] Field of Search ............................... 83/337, 76, 646, 83/647.5, 594, 591, 305, 304, 318

[56] References Cited

U.S. PATENT DOCUMENTS

| | | | |
|---|---|---|---|
| 2,753,001 | 7/1956 | Page | 83/337 |
| 3,641,858 | 2/1972 | Tuschy et al. | 83/337 |
| 3,867,081 | 2/1975 | Everett | 83/646 |
| 3,918,336 | 11/1975 | Macey et al. | 83/255 |
| 4,165,665 | 8/1979 | Shimizu et al. . | |
| 4,462,290 | 7/1984 | Wallis . | |
| 4,515,047 | 5/1985 | Komanduri | 407/7 |
| 4,621,554 | 11/1986 | Poloni . | |
| 4,635,511 | 1/1987 | Shirasu | 83/76 |
| 4,712,461 | 12/1987 | Rasmussen | 83/337 |
| 4,919,025 | 4/1990 | Snyder | 83/647.5 |
| 4,956,987 | 9/1990 | Hara et al. . | |
| 5,040,397 | 8/1991 | Bodnar | 83/337 |
| 5,063,801 | 11/1991 | Wallis | 83/76 |
| 5,301,584 | 4/1994 | Rhodes | 83/320 |

FOREIGN PATENT DOCUMENTS

| | | | |
|---|---|---|---|
| 491955 | 1/1930 | Germany | 83/337 |
| 57-186221 | 11/1982 | Japan . | |
| 2-24019 | 1/1990 | Japan . | |
| 4-152017 | 5/1992 | Japan . | |
| 4-78407 | 12/1992 | Japan . | |
| 262374 | 11/1970 | U.S.S.R. | 83/337 |
| 311421 | 8/1930 | United Kingdom | 83/647.5 |
| 1156927 | 7/1969 | United Kingdom . | |
| 1542479 | 3/1979 | United Kingdom . | |
| 2074921 | 11/1981 | United Kingdom . | |

*Primary Examiner*—Kenneth E. Peterson
*Attorney, Agent, or Firm*—Cushman Darby & Cushman IP Group of Pillsbury Madison & Sutro LLP

[57] ABSTRACT

A cutting device capable of obtaining high speeds, approximately three times faster than known cutting devices by using a structure employing an internal positive cam. A rotary slider rotates upon rotation of a spline shaft via a gearbox, and the operation is such that a track of a wedge-shaped blade tip of a male cutter lies along a workpiece via cam followers slidably rotating over a sliding surface of an internal positive cam, cutting the workpiece.

15 Claims, 5 Drawing Sheets

CUTTING DEVICE

This is a continuation of application Ser. No. 08/285,102, filed on Aug. 3, 1994, which was abandoned.

BACKGROUND OF THE INVENTION

1. Field of the Invention

The present invention relates to a cutting device for high-speed and high-accuracy fixed-long cutting of long tubular materials (hereinafter referred to as the "workpiece"). More particularly, the present invention relates to a device for accurately cutting flat tubing employed in radiators or condensers of heat exchangers for use in motor vehicles. The tubing is fed continuously into the cutting device at a uniform speed.

2. Related Art

In known cutting devices for flat tubing, housing 91, as shown in FIG. 4, is disposed so as to freely reciprocate vertically above a base with a guide rail (not illustrated), which serves as a track. On housing 91, opening 92 guides a workpiece. Two female blades 93 of planar configuration are fixed to form a cutting blade at the perimeter of opening 92. Moving blade 94 having a planar configuration forms a cutting blade with center blade tip portion 99. Blade tip portion 99 is acute and is provided in the housing 91 so as to be freely reciprocable in a vertical direction by means of air cylinder 95. During advancement caused by the reciprocating motion of housing 91, which occurs at the same speed and in the same direction as the travel speed of the workpiece, moving blade 94 is made to advance between female blades 93 via upward movement of air cylinder 95 and thus cuts the workpiece passed through the opening 92. Further, after air cylinder 95 is lowered and the moving blade 94 is retracted, housing 91 is retracted in the direction opposite the direction of travel of the workpiece, completing the cutting cycle. Further advantages relating to high-speed cutting have been disclosed in Japanese Unexamined Patent Publication No. 2-24019 and in Japanese Unexamined Patent Publication No. 4-152017 wherein, as shown in FIG. 5, female blades 93 are fixed to the housing (not shown) of the cutting device, cutting blade 98 of the perimeter of rotary blade 97 is rotated by means of shaft 96 journaled on the housing, and the workpiece passed through the opening is cut.

However, in the cutting device of the prior art depicted in FIG. 4, blade tip portion 99 of moving blade 94 is made to cooperate with the cutting blade formed on the perimeter of the opening and the workpiece is cut laterally, and so the cut surface is excellent, but it is very difficult to perform high-speed cutting above a certain limit, for example at a rate of more than once per every 0.3 second, with the workpiece travelling at 120 m/min., because of operational lag of air cylinder 95 due to air compression. Thus, the cut length and travel speed of the workpiece are restricted. Additionally, in the cutting device depicted in FIG. 5, blade tip portion 99 of cutting blade 98 undergoes circular movement. Not only is it difficult to make blade tip portion 99 always contact the central portion of the workpiece, but also even if it is attempted to make the tip of cutting blade 98 saw smoothly, the amount of movement of cutting blade 98 in a direction perpendicular to the longer direction of opening 92 is slight. Thus, defects may appear on the cut surface, depending on the cross-sectional configuration, plate thickness, and composition of the workpiece, and secondary machining was thus necessitated. The present inventor has attempted to solve this problem.

Accordingly, in Japanese unexamined patent publication No. 4-78407 the present inventor proposed the following idea in order to increase speed by using groove-cam system. As shown in FIGS. 6 and 7, when servomotor 5 operates, the motor and crank mechanism 6 cause slider 12 to reciprocate linearly on rails 13 and 13 as a track, and motor 5 rotates a four-joint rotary link mechanism 100 on the slider by one turn in synchronization with one reciprocation of slider 12, causing revolution while maintaining the respective attitudes of link member 19 and journal member 22. During the movement of slider 12 at the same speed and in the same direction as the direction of travel of the workpiece (not shown) guide roller 28 engages with linear groove 37 of cam groove 31, a blade tip portion of a cutting blade formed on moving blade 94 is made to move linearly along the centerline in the longer direction of an opening 10 formed in a female blade 93 which constitutes a fixed blade 9. The workpiece inserted into opening 10 is cut.

However, in the above-described groove-cam system disclosed in Japanese unexamined patent publication No. 4-78407, when the mechanism is used as shown in FIG. 7, because crank mechanism 6 flexes as slider 12 reciprocates, and because the groove cam 101 is not made with a cam curve the cutter device vibrates, one cut per every 0.15 seconds, with the workpiece traveling at a speed of 120 m/min., is the upper limit to which the speed may be increased. Consequently, the problem of the inability to cut flat tubing having a soft composition, such as aluminum material, at high speed and with high precision remained unresolved until the advent of the present invention.

SUMMARY OF THE INVENTION

An object of the present invention is to provide a cutting device that can increase the speed of a cutting device to speeds about three times faster than previously known cutting devices by using a structure having an internal positive cam, a cam in which the displacement of the cam is transmitted without change to followers, with the followers never becoming separated from the cam.

One preferred embodiment of the present invention provides a cutting device including a contact roller which frictionally contacts and rotates a workpiece, an analog/digital converter interconnected with the contact roller and which generates pulses proportional in number to the speed of the workpiece, and a servomotor synchronized with the pulses to rotate at a rotational speed that corresponds to cutting length. A slider is interconnected with the servomotor via a crank mechanism and reciprocates along the workpiece at a speed identical to the workpiece. Further, a rotary slider is disposed so as to be movable linearly in a direction perpendicular to the direction of the reciprocating motion of the slider, as well as being rotatably driven via the servomotor. A male blade is installed on the rotary slider and has a wedge-shaped blade tip, while a pair of female blades interposing the male blade and have a hole through which the workpiece passes. An internal positive cam includes an inner wall defining a sliding surface that causes periodic motion of the rotary slider according to a cam curve, which is established so that a track of the wedge-shaped blade tip is along the workpiece. A pair of cam followers is journaled on the rotary slider and conveys periodic motion to the rotary slider by means of sliding and rotating over the sliding surface of the internal positive cam.

According to a cutting device having such a structure, a contact roller frictionally contacts a workpiece and rotates, by means of which pulses proportional to the amount of movement of the workpiece are generated from an analog/ digital converter, with the pulses controlling rotation of a servomotor. When the servomotor rotates, a slider interconnected to the motor via a crank mechanism reciprocates along the workpiece at a speed identical to that of the workpiece, and a spline shaft is driven to rotate via a gearbox. The rotary slider then rotates by means of the rotation of the spline shaft, and cam followers contact and rotate over the sliding surface of an internal positive cam. Thus, a wedge-shaped blade tip of a male blade passes through the center of the workpiece to cut the workpiece.

BRIEF DESCRIPTION OF THE DRAWINGS

Other objects, features, and advantages of the present invention will become apparent to those skilled in the art based upon a study of the following detailed description, appended claims, and figures, all of which form a part of this specification. In the figures, like reference numerals represent like elements, and the figures are:

DETAILED DESCRIPTION OF THE PRESENTLY PREFERRED EXEMPLARY EMBODIMENT

Figure 1:
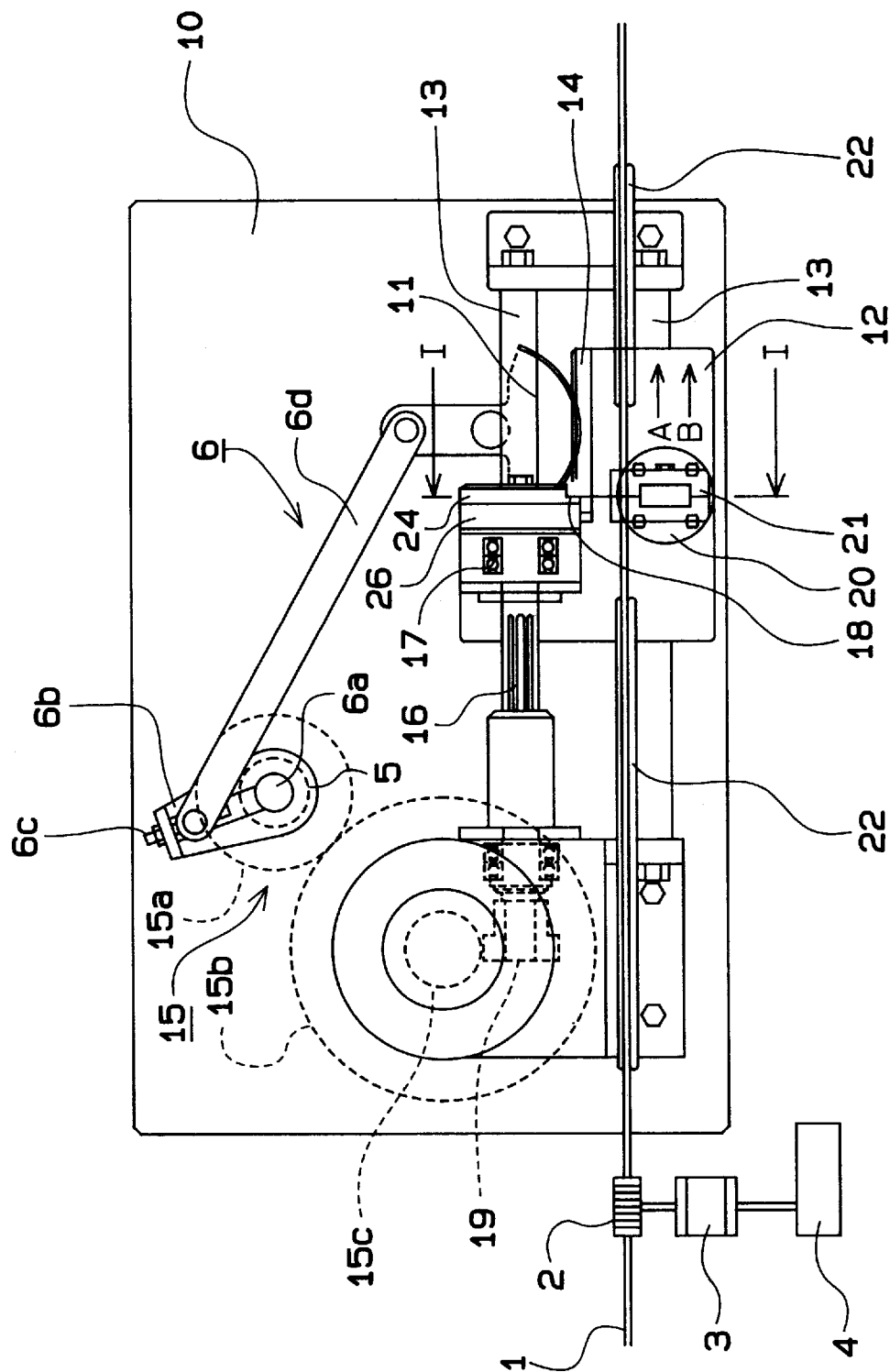
FIG. 1 is a plan view indicating the overall structure of an embodiment of the present invention.
Figure 2:
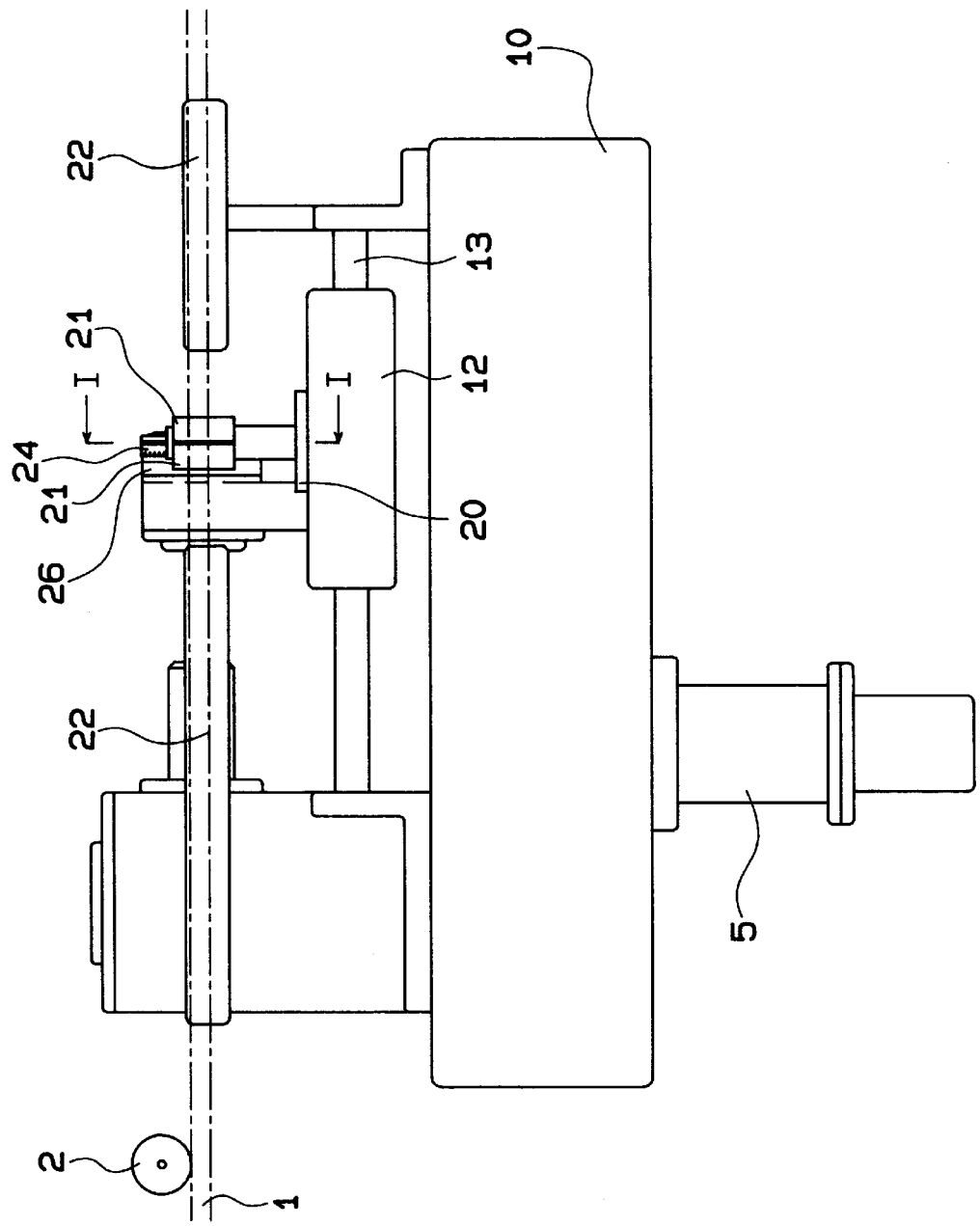
FIG. 2 is a side view indicating the overall structure of the embodiment shown in FIG. 1 of the present invention.
Figure 3:
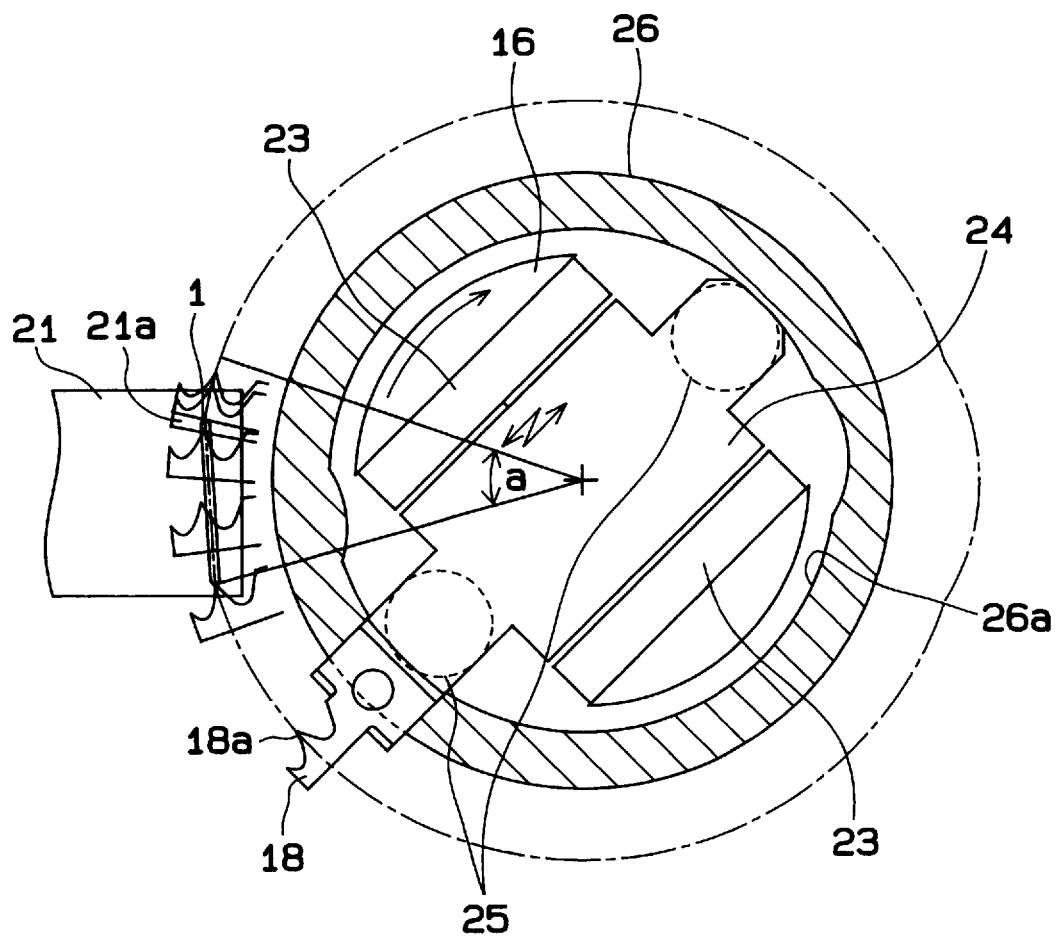
FIG. 3 is a sectional view on line I—I of FIG. 1 and FIG. 2.
Figure 4:
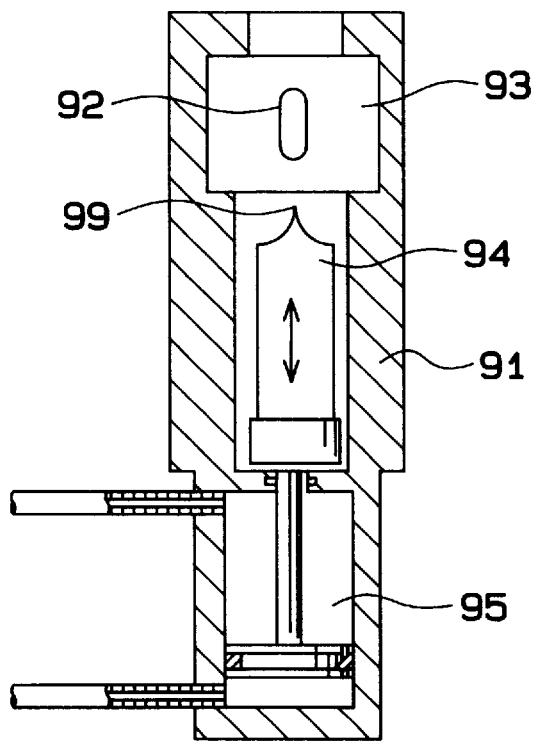
FIG. 4 to FIG. 7 are schematic diagrams depicting related cutting devices.
Figure 5:
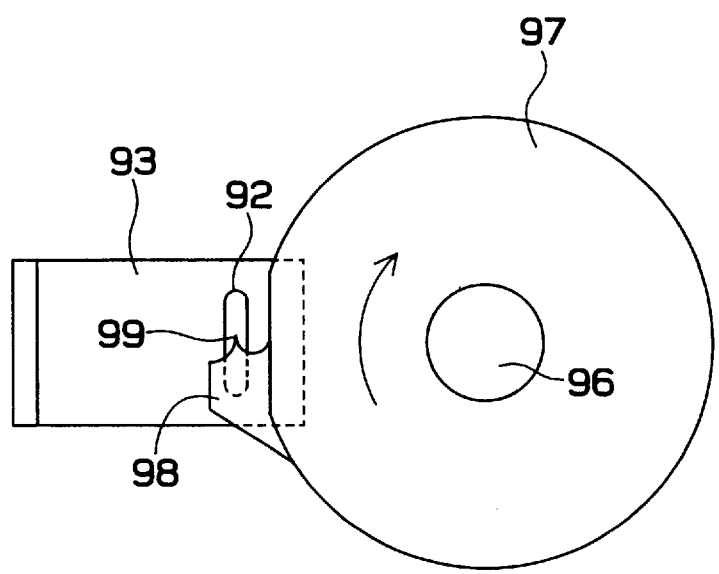
Figure 6:
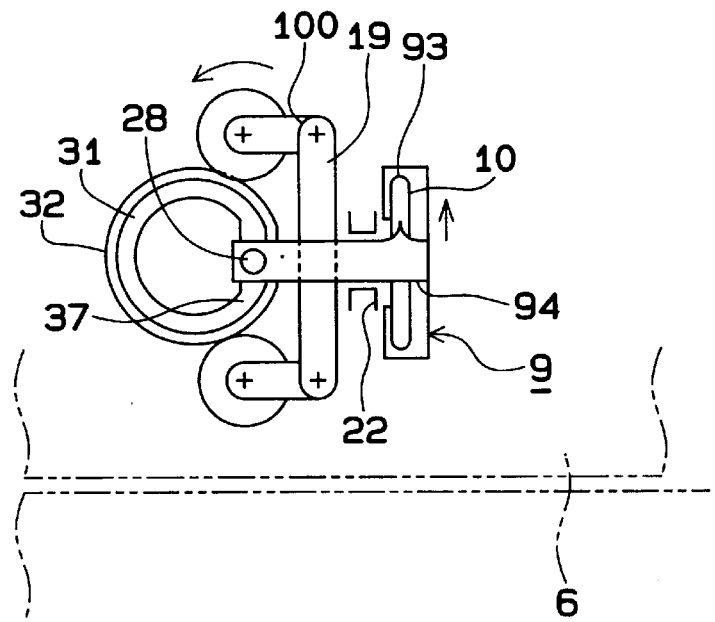
Figure 7:
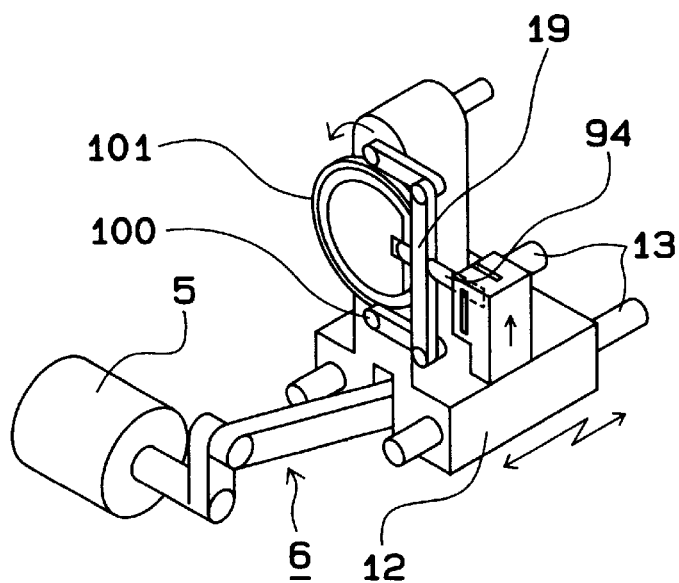

An embodiment of the cutting device according to the present invention will be described below with reference to FIGS. 1 to 3.

Flat tubing 1, such as that used in heat exchangers, which serves as the workpiece, is supplied continuously from a tube manufacturing machine (not illustrated). Flat tubing 1 supplied from the tube manufacturing machine frictionally contacts contact roller 2. Contact roller 2 is rotated via movement of tubing 1, with no idle rotation occurring. Contact roller 2 is interconnected with analog/digital converter 3, which generates one pulse every time contact roller 2 rotates a certain angle. The output of analog/digital converter 3 passes through a waveform generator circuit (not illustrated) and is input to drive unit 4. Drive unit 4 converts the input thereto into rotation signals required for driving servomotor 5, and is transmitted to servomotor 5.

Crank mechanism 6, which interconnects servomotor 5 and slider 12, described below, is formed of crankshaft 6a directly coupled to the shaft of servomotor 5, crank 6b secured to crankshaft 6a, and connecting rod 6d attached to crank 6b so as to allow adjustment of eccentricity by means of eccentricity adjustment screw 6c. Connecting rod 6d is interconnected with sector gear 11, which can rock freely on base 10.

Slider 12 is supported so as to slide freely by means of two rails 13 fixed to base 10. Rack 14, which meshes with sector gear 11, is notched into a portion of the side surface, and reciprocates as shown by arrows A and B to accompany the rocking of sector gear 11. Gearbox 15 is interposed between servomotor 5 and male blade 18 and includes a gear 15a secured to crankshaft 6a, gear 15b which meshes with gear 15a, and gear 15c that rotates integrally with gear 15b.

Spline shaft 16 is attached to slider 12 via bearing 17 so as to rotate freely, and at one end direct-acting bearing 23 (FIG. 3) is attached perpendicularly to spline shaft 16. Rotary slider 24 is rotated by means of spline shaft 16 via direct-acting bearing 23. Cam followers 25 (FIG. 3) are journaled rotatably on rotary slider 24, and cam followers 25 transmit periodic motion to the rotary slider 24 by sliding and rotating over a sliding surface 26a (FIG. 3) of internal positive cam 26 attached to slider 12. Screw gear 19, which meshes with the gear 15c, is provided on end of spline shaft 16 opposite positive cam 24, and is driven to rotate via gearbox 15 by means of servomotor 5 (FIG. 1). As described above, internal positive cam 26 is such that the displacement of cam 26 is transmitted without change to the followers with the followers never becoming separated from cam 26. In the present embodiment the follower is the rotary slider 24.

A pair of female blades 21 and 21 disposed proximate male blade 18 are disposed on cutting holder 20 attached on slider 12. As shown in FIG. 3, the cutting mechanism composed of male blade 18 and female blades 21 is such that wedge-shaped blade tip 18a protruding radially is provided on a portion of the outer periphery of male blade 18, and holes 21a through which flat tubing 1 is inserted are provided on females blades 21. By adjusting the eccentricity of connecting rod 6d via eccentricity adjustment screw 6c, slider 12 can be tracked at a speed equal to the speed of movement of flat tubing 1. During the interval when slider 12 is tracking flat tubing 1, a cutting angle α whereby wedge-shaped blade tip 18a of male blade 18 cuts flat tubing 1 is established so that male blade 18 cuts the flat tubing 1. Furthermore, flat tubing 1 is guided to holes 21a of female blades 21 by means of guide 22.

The operation of a cutting device having the structure described above will be described below.

When flat tubing 1 is supplied from a tube manufacturing machine (not illustrated) and movement begins, contact roller 2 rotates, thus causing analog/digital converter 3 to generate pulses corresponding to the amount of rotation. Consequently, the number of pulses is proportional to the speed of movement of flat tubing 1. The pulse signals are input to drive unit 4, and drive unit 4 causes rotation of servomotor 5 in correspondence with the number of generated pulses. Thus, crankshaft 6a, which is directly coupled to servomotor 5, rotates, and gear 15a and crank 6b, secured to the crankshaft 6a, rotate. Reciprocal motion is produced at connecting rod 6b by the rotation of crankshaft 6a, and accordingly sector gear 11 journaled on base 10 rocks. Because of this, the sector gear 11 causes the rack 14 with which it is meshed to reciprocate, and the speed of the reciprocal motion of slider 12 parallel to flat tubing 1 varies with a substantial sine curve as indicated by arrows A and B.

Meanwhile, gear 15b forming a set with gear 15c to make up a gearbox, rotates via rotation of gear 15a, and spline shaft 16 rotates via screw gear 19. When slider 12 performs tracking at a speed substantially equal to the transfer speed of flat tubing 1 during the reciprocating stroke of slider 12, flat tubing 1 is cut by male blade 18. At that time, the locus of wedge-shaped blade tip 18a of male blade 18 passes along the center of flat tubing 1 by means of the sliding and rotation of the cam followers 25 on the sliding surface 26a within the internal positive cam 26 with which internal contact is made, and so better productivity can be achieved.

In addition, a cutting device as described above possesses the following advantages over previously known cutting devices. First, by employing an internal positive cam, two cam followers are used, and so the load applied per cam follower can be alleviated. Second, because this is an internal positive cam, the cam followers can be pre-loaded, to eliminate rattle, and so the present invention has a low susceptibility to the generation of vibration. Third, because a cam curve advantageous to achieving higher speeds is used for the internal positive cam, there is low susceptibility to the generation of vibration. Fourth, because this is an internal positive cam, there is no rattle even if centrifugal forces are generated in the cam followers when at high speeds, so there is low susceptibility to the generation of vibration. Finally, because the structure of the slider is compact and can be made light in weight, there is low susceptibility to the generation of vibration due to the reciprocating motion of the slider. These and other advantages of the present invention will be appreciated by those skilled in the art.

By means of the effects such as alleviation of vibration and lighter weight that are described above, the present invention allows it to be possible to cut a workpiece traveling at 180 m/min. at a rate of once per 0.05 second. This is at least three times as fast as the previously known cutting devices. Furthermore, because vibration is also reduced, it becomes possible to cut the length of the workpiece with high precision.

A cutting device of the present invention possesses the above-described structure, and by using a structure employing an internal positive cam, provides the outstanding advantage of being able to obtain high speeds approximately three times faster than a cutting device of the prior art.

What is claimed is:

1. A cutting device, comprising:

a servomotor constructed and arranged to rotate at a rotational speed corresponding to a speed of passage of said workpiece through said cutting device;

a first slider interconnected with said servomotor via a crank mechanism and mounted for reciprocating motion along said workpiece at the speed of said workpiece;

a rotary slider mounted with respect to said first slider so as to be rotatable in a direction perpendicular to the direction of the reciprocating motion of said first slider, as well as to be driven to rotate by means of said servomotor in accordance with the speed of said workpiece;

a male blade attached to said rotary slider and having a wedge-shaped blade tip;

a pair of female blades disposed proximate said male blade and having a hole through which said workpiece is passed;

an internal positive cam having a substantially circular cam surface on an inner wall thereof; and a pair of cam followers each journaled a fixed distance apart on said rotary slider such that both of said cam followers maintain continuous contact with said cam surface and conveying periodic motion to said rotary slider by means of sliding and rotating over said cam surface of said internal positive cam, said cam surface having opposed deviations for guiding said rotary slider in such a manner than a track of said male blade is perpendicular to said workpiece and said male blade cuts a center of said workpiece linearly.

2. The cutter device as in claim 1 including said workpiece and wherein said workpiece has a flat tube shape.

3. The device of claim 1, further comprising:

a contact roller constructed and arranged to frictionally contact a workpiece and to rotate so as to move the workpiece; and an analog/digital converter interconnected with said contact roller and generating pulses proportional in number to the speed of said workpiece;

wherein the servomotor is constructed and arranged to rotate at a rotational speed based on a pulse from said analog/digital converter corresponding to a cutting length.

4. The device of claim 1, wherein the pair of cam followers are pre-loaded on said rotary slider.

5. The device of claim 1, wherein said pair of cam followers are journaled at opposite ends of said rotary slider.

6. The device of claim 1, where said pair of cam followers are journaled symmetrically with respect to a center of said rotary slider.

7. The device of claim 1, wherein said pair of cam followers are journaled on said rotary slider so that a movement of one of said cam followers in a direction of sliding of said rotary slider is accompanied by a movement of the other of said cam followers in said direction of sliding of said rotary slider.

8. The device of claim 1, wherein said pair of cam followers are journaled on said rotary slider so that movement of one of said cam followers in a radial direction with respect to rotation of said rotary slider is accompanied by movement of the other of said cam followers in a radially opposite direction.

9. A cutting device, comprising:

a first slider disposed along said workpiece and mounted for reciprocating motion at the speed of said workpiece;

a rotary slider mounted with respect to said first slider so as to be rotatable in a direction perpendicular to the direction of the reciprocating motion of said first slider, as well as to be driven to rotate by means of said servomotor in accordance with the speed of said workpiece;

a male blade attached to said rotary slider and having a wedge-shaped blade tip;

a pair of female blades disposed proximate said male blade and having a hole through which said workpiece is passed;

an internal positive cam having a substantially circular cam surface on an inner wall thereof; and a pair of cam followers journaled a fixed distance apart on said rotary slider such that both of said cam followers continuously contact with and slide over said cam surface, said cam surface having opposed deviations such that said male blade moves perpendicular to said workpiece and cuts a center of said workpiece linearly.

10. The cutter device as in claim 9 including said workpiece and wherein said workpiece has a flat tube shape.

11. The device of claim 9, further comprising:

detecting means for detecting a speed of a workpiece and generating pulses proportional in number to the speed of said workpiece;

wherein the first slider is mounted for reciprocating motion at the speed of said workpiece based on pluses generated by said detecting means; and the rotary slider mounted with respect to said first slider so as to be driven to rotate by means of said workpiece based on said pulses generated by said detecting means.

12. The device of claim 9, wherein the pair of cam followers are pre-loaded to continuously contact with and slide over said cam surface.

13. The device of claim 9, wherein said pair of cam followers are journaled at opposite ends of said rotary slider.

14. The device of claim 9, where said pair of cam followers are journaled symmetrically with respect to a center of said rotary slider.

15. The device of claim 9, wherein said pair of cam followers are journaled on said rotary slider so that movement of one of said cam followers in a direction of sliding of said rotary slider is accompanied by movement of the other of said cam followers in said direction of sliding of said rotary slider.

* * * * *